(12) United States Patent
Van Bommel et al.

(10) Patent No.: US 9,608,724 B2
(45) Date of Patent: Mar. 28, 2017

(54) METHOD, LIGHT MODULE AND RECEIVING UNIT FOR LIGHT CODING

(71) Applicant: PHILIPS LIGHTING HOLDING B.V., Eindhoven (NL)

(72) Inventors: Ties Van Bommel, Horst (NL); Rifat Ata Mustafa Hikmet, Eindhoven (NL); Tim Corneel Wilhelmus Schenk, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/435,347

(22) PCT Filed: Oct. 7, 2013

(86) PCT No.: PCT/IB2013/059172
§ 371 (c)(1),
(2) Date: Apr. 13, 2015

(87) PCT Pub. No.: WO2014/060895
PCT Pub. Date: Apr. 24, 2014

(65) Prior Publication Data
US 2015/0270896 A1    Sep. 24, 2015

Related U.S. Application Data

(60) Provisional application No. 61/714,437, filed on Oct. 16, 2012.

(51) Int. Cl.
H04B 10/00      (2013.01)
H04B 10/116    (2013.01)
H05B 37/02      (2006.01)

(52) U.S. Cl.
CPC ....... H04B 10/116 (2013.01); H05B 37/0272 (2013.01)

(58) Field of Classification Search
CPC .............. H04B 10/116; H04B 10/1143; H04B 10/1149; H04B 10/114; H04B 10/112;
(Continued)

(56) References Cited

U.S. PATENT DOCUMENTS

2006/0239689 A1    10/2006    Ashdown
2007/0008258 A1     1/2007     Yamamoto
(Continued)

FOREIGN PATENT DOCUMENTS

WO    2006079199 A1    8/2006
WO    2010103451 A1    9/2010
WO    2011065787 A2    6/2011

Primary Examiner — Hanh Phan
(74) Attorney, Agent, or Firm — Meenakshy Chakravorty

(57) ABSTRACT

A method for embedding data in light, wherein the method comprises the step of operating at least two light sources (A, B) arranged to emit light (101) having color coordinates (x, y) and luminous intensity (Y), wherein each light source is arranged to emit light (101a, 101b) which is distinguishable from the light of at least one other light source, and embedding data in the light emitted from the at least two light sources. The method further comprises the step of operating the at least two light sources such that the color coordinates of the light emitted from the at least two light sources are maintained over time within a first, bounded interval (115), and the luminous intensity of the light emitted from the at least two light sources is maintained over time within a second, bounded interval (116).

18 Claims, 6 Drawing Sheets

(58) Field of Classification Search
CPC ............ H04B 10/1123; H04B 10/1127; H04B 10/1129; H05B 33/0863; H05B 33/0869; H05B 33/0227
USPC ....... 398/172, 118, 119, 127, 128, 130, 183, 398/158, 159, 136, 189, 186, 202, 208, 398/209, 187, 192, 193, 194, 195, 135; 315/152, 297, 291, 294, 312, 158, 159, 315/293

See application file for complete search history.

(56) References Cited

U.S. PATENT DOCUMENTS

| | | | |
|---|---|---|---|
| 2008/0063410 A1 | 3/2008 | Irie | |
| 2008/0298811 A1 | 12/2008 | Son et al. | |
| 2010/0066269 A1* | 3/2010 | Luijks | H01J 61/827 315/294 |
| 2011/0044701 A1* | 2/2011 | Schenk | H05B 37/02 398/183 |
| 2011/0200338 A1 | 8/2011 | Yokoi | |
| 2011/0309755 A1 | 12/2011 | Wirth | |

* cited by examiner

METHOD, LIGHT MODULE AND RECEIVING UNIT FOR LIGHT CODING

CROSS-REFERENCE TO PRIOR APPLICATIONS

This application is the U.S. National Phase application under 35 U.S.C. §371 of International Application No. PCT/IB2013/059172, filed on Oct. 7, 2013, which claims the benefit of U.S. Provisional Patent Application No. 61/714, 437, filed on Oct. 16, 2012. These applications are hereby incorporated by reference herein.

FIELD OF THE INVENTION

The present invention relates to a method and a light module for embedding data in light, and a receiving unit for receiving light. More specifically, the method, the light module and the receiving unit of the present invention relate to the field of visible light communication.

BACKGROUND OF THE INVENTION

Visible light communications (VLC) is a data communication method wherein data is embedded in the light output of a light source emitting visible light (usually in the wavelength range of 375-780 nm). In VLC, it is desirable to use light emitting diodes (LEDs) as a light source, as the LEDs are able to achieve a considerably higher data transmission rate compared to fluorescent lamps.

Coded light has been proposed as a special VLC technique to enable advanced control of light sources and to transmit information using these light sources. Since the primary purpose of a light source is typically illumination, it is important that the modulation of the light output of the light source is invisible to human eyes, also referred to as a flicker-free modulation. Different methods have been developed in the prior art to achieve a flicker-free modulation of the light output, wherein amplitude or intensity modulation of the light output of the light source is one of the most commonly applied methods. To embed data in this method, the light source is either switched fully switched on/off (on-off keying) or the amplitude is modified. This method typically needs to be combined with a coding method to reduce the spectral content in the frequencies below several hundreds of Hertz, which are visible to human eyes. Due to this coding, the effective data rate is reduced and a higher bandwidth needs to be applied to achieve the same data rate. This might be challenging, since LEDs and their associated drivers are typically limited in their bandwidth.

A further method which is applied in the prior art for VLC is frequency modulation, or frequency shift keying. Here, the data is embedded by switching between two different modulation (switching) frequencies, where e.g. one frequency signifies the "zero" bit and the second frequency the "one" bit. A disadvantage of this method is that the applied frequencies need to be high to avoid visible flicker, which reduces the effective bandwidth available for data communication.

A even further modulation method in the prior art for VLC modulation uses multiple light sources with a different color point (x,y-coordinates in a chromaticity diagram) to embed data in the light. In this method, the perceived intensity of the light is kept constant, while the color is changed. This is based on the understanding that the human eye is less sensitive to color point changes than to intensity changes. However, a disadvantage of this method is that the modulation amplitude can only be limited, since an unwanted visibility will otherwise occur. Alternatively, the modulation frequency needs to be high, which may also be undesired. Further, the light source used need to have sufficiently different color points with respect to each other (e.g. red, green, blue), which might not be desired for a general illumination, e.g. white light.

In view of this, there is a wish to provide an alternative modulation of the light which overcomes the above-mentioned disadvantages of the modulation methods in the prior art.

SUMMARY OF THE INVENTION

It is an object of the present invention to provide a widening of the modulation bandwidth of light coding while providing a flicker-free modulation of the light output. This and other objects are achieved by a method and light module for emitting light, and a receiving unit for receiving light, having the features set forth in the independent claims. Preferred embodiments are defined in the dependent claims.

Hence, according to a first aspect of the present invention, there is provided a method for embedding data in light. The method comprises the step of operating at least two light sources arranged to emit light having color coordinates and a luminous intensity. The method further comprises the step of operating the at least two light sources such that each light source is arranged to emit light which is distinguishable from the light of at least one other light source, and embedding data in the light emitted from the at least two light sources. The method further comprises the step of operating the at least two light sources such that the color coordinates of the light emitted from the at least two light sources are maintained over time within a first, bounded interval. Furthermore, the method comprises the step of operating the at least two light sources such that the luminous intensity of the light emitted from the at least two light sources is maintained over time within a second, bounded interval.

According to a second aspect of the present invention, there is provided a light module arranged to embed data in light. The light module is configured to operate at least two light sources arranged to emit light having color coordinates and luminous intensity, wherein each light source is arranged to emit light which is distinguishable from the light of at least one other light source, and to embed data in the light emitted from the at least two light sources. The light module is further configured to operate the at least two light sources such that the color coordinates of the light emitted from the at least two light sources are maintained over time within a first, bounded interval. Furthermore, the light module is configured to operate the at least two light sources such that the luminous intensity of the light emitted from the at least two light sources is maintained over time within a second, bounded interval.

According to a third aspect of the present invention, there is provided a receiving unit for receiving light. The receiving unit is configured to receive light emitted from at least two light sources arranged to emit light having color coordinates and luminous intensity, wherein each light source is arranged to emit light which is distinguishable from the light of at least one other light source, wherein data is embedded in the emitted light, and wherein the color coordinates of the light emitted from the at least two light sources are maintained over time within a first, bounded interval, and the luminous intensity of the light emitted from the at least two light sources is maintained over time within a second, bounded interval. The receiving unit is further arranged to detect data embedded in the received light. By "receiving unit", it is here meant virtually any unit for receiving, detecting and/or registering light, such as a receiver, a sensor, a detector, etc., wherein the receiving unit may further be a CMOS sensor or a CCD sensor array.

Thus, the first and second aspects of the present invention are based on the idea of embedding data in light by operating at least two light sources, wherein the light from each light source is distinguishable from the light of at least one other light source. In other words, data is embedded in the emitted light, as the light from each light source is distinguishable (separable, different) from the light of at least one other light source with respect to at least one property of the light. Further, the at least two light sources are operated such that the color coordinates and the luminous intensity of the light emitted from the light sources are maintained over time within respective bounded intervals. Analogously, the third aspect of the present invention is based on the idea of receiving light as emitted by the first and/or second aspect of the present invention, and to detect the data embedded in the received light.

The first and second aspects of the present invention are advantageous in that they provide a modulation of the light by means of a distinguishable light from the light sources while maintaining a (almost) constant color and luminous intensity of the light, which results in a flicker-free modulation of the light emitted from the light sources during operation. As the human eye is very sensitive to intensity variations of the light, the (almost) constant luminous intensity of the light, provided by the first and second aspects of the present invention, achieves a pleasant, convenient and flicker-free light from the light sources during data transmission. In contrast, modulation techniques in the prior art (e.g. frequency and/or intensity modulation techniques) often render an inconvenient and/or flickering light, which may be perceived as disturbing for a human subjected to the light. Furthermore, as the first and second aspects of the present invention are able to provide an (almost) constant color of the light from the light sources by maintaining the color coordinates of the light, the first and second aspects of the present invention even further contribute to a lighting which is perceived by the human eye as pleasant and convenient. Hence, the first and second aspects of the present invention also provide an improved lighting compared to modulation techniques in the prior art wherein data is embedded in the color output of the light, i.e. wherein the color of the light is changed. Consequently, the method and the light module of the present invention provide a light output which is perceived as continuous and smooth (i.e. non-disturbing) for a person subjected to the emitted light, resulting in an improved lighting compared to arrangements in the prior art.

As the method and the light module are able to operate the at least two light sources such that the color coordinates and the luminous intensity of the light from the light sources are (almost) constant, the light from the light sources may further be used for any purpose of (ordinary) lighting, such as illumination in a room, an office, a store, etc. For example, the light from the light sources may assist a person in e.g. writing, reading, etc., without distracting the attention of the observer. The operation of the light sources according to the first and second aspects of the present invention provides an even, smooth, regular light which is perceived by the person as convenient and pleasant, and further avoids that attention is drawn to the lighting from the light sources itself.

The method and the light module of the present invention are further advantageous in that a widened modulation bandwidth of light coding compared to methods and/or arrangements in the prior art is provided. By embedding data in light, wherein each light source is arranged to emit light which is distinguishable from the light of at least one other light source, the modulation of the light output is improved compared to arrangements in the prior art (e.g. using intensity modulation, frequency modulation and/or frequency shift keying), in which the effective bandwidth is reduced for data communication. Consequently, the efficient and convenient method and light module of the present invention avoid a more complex, circumstantial and/or more costly method and/or arrangement for data transmission.

The method and the light module of the present invention further provide alternative solutions to modulations methods applying different color coordinates for embedding data in the emitted light. This is realized as the light sources in the modulation methods of the prior art may require a sufficiently different color point (e.g. R, G, B), which might not be desired for general illumination, e.g. white light.

The method comprises the step of operating at least two light sources. In other words, the method comprises the step of operating a number between two and all of the light sources, wherein two or more light sources may be operated simultaneously or wherein one light source may be operated at a time. Furthermore, the at least two light sources are arranged to emit light having color coordinates and a luminous intensity. By "color coordinates", it is meant the xy-plane of a color space, known to a person skilled in the art as the chromaticity diagram.

The method further comprises the step of operating the at least two light sources such that each light source is arranged to emit light which is distinguishable from light of at least one other light source, wherein data is embedded in the light. In other words, each light source is able to emit light with at least one unique/individual property, such that the light is distinguishable from the light of at least one other light source.

The method further comprises the step of operating the at least two light sources such that the color coordinates of the light from the at least two light sources are maintained over time within a first, bounded interval, and the luminous intensity of the light from the at least two light sources is maintained over time within a second, bounded interval. By "bounded interval", it is here meant a (very) narrow, predetermined, bounded interval, such that the color coordinates of the light from the light sources are (almost) equal. Hence, as the method operates the light sources to maintain the color coordinates of the light from the light sources over time within a (narrow, predetermined) bounded interval along the x-axis and y-axis of the chromaticity diagram, the color is experienced as the same (constant) color by a person subjected to the light. Analogously, the luminous intensity of the light from the light sources is (almost) constant, i.e. the luminous intensity of the light is perceived by a human eye as being (almost) constant. Hence, the method maintains/preserves a constant color as well as a constant luminous intensity of the light from the light sources.

Alternatively, the at least two light sources may be operated such that the luminous intensity of the light emitted from the at least two light sources is maintained within a bounded interval, wherein the luminous intensity decreases or increases on a relatively long time scale. In other words, the two light sources may be operated such that the luminous intensity of the light is (slowly) dimmed or (slowly) increased, as a luminous intensity decrease or increase on a relatively long time scale still provides a lighting which is perceived by a person as convenient and pleasant.

It will be appreciated that the explanatory text above related to the method of the first aspect of the present invention analogously holds for the light module of the second aspect of the present invention, and the receiving unit of the third aspect of the present invention.

According to an embodiment of the present invention, the embedding of data comprises operating the at least two light sources such that each light source is arranged to emit light with a spectral distribution which is different from the spectral distribution of light of at least one other light source. In other words, light emitted from a light source has a unique (individual) spectral distribution of the light, which is distinguishable (different) from the spectral distribution of light emitted from at least one other light source. Data is embedded in the emitted light as the spectral distribution of the light is associated with data. The present embodiment is advantageous in that data, embedded in the spectral distribution(s) of the light, may thereby be conveniently transmitted, without the need of employing a change in intensity and/or color for data transmission.

According to an embodiment of the present invention, the embedding of data in the emitted light comprises associating a logical one or a logical zero with the emitted light. It will be appreciated that the embodiment hereby encompasses several mappings between the light and the data. For example, the characteristics of light from a light source may be associated with a logical one or a logical zero. An example of this is that a first light source may be switched "on" and a second light source may be switched "off" at a point in time, wherein the characteristics of the light emitted from the first light source may e.g. signify a logical one. Thereafter, the first light source may be switched "off" and the second light source may be switched "on" at a later point in time, wherein the characteristics of the second light source may e.g. signify a logical zero. It will be appreciated that the state "on" may comprise any intensity level of the maximum intensity level of the light source, e.g. 100%, 75% or 25%, and/or that two or more light sources may be operated simultaneously. For example, a first light source may be switched "on" to an intensity level of 60% and a second light source may be switched "on" to an intensity level of 40%, wherein the light from the first light source may be associated with a logical one and the light from the second light source may be associated with a logical zero.

Alternatively, the characteristics of light from a light source may be associated with a specific light source which is arranged to code a logical one or a logical zero. An example of this is that a first light source may be switched "on" and a second light source may be switched "off" at a point in time, wherein the characteristics of the light emitted from the first light source may e.g. signify that the first light source is "on", which is arranged to transmit a logical one. Thereafter, the first light source may be switched "off" and the second light source may be switched "on" at a later point in time, wherein the characteristics of the light emitted from the second light source may e.g. signify that the second light source is "on", which is arranged to transmit a logical zero. In the embodiment of the present invention wherein the embedding of data comprises operating the at least two light sources such that each light source is arranged to emit light with a spectral distribution which is different from the spectral distribution of light of at least one other light source, the (unique) spectral distribution may be associated with, or correspond to, a logical one or a logical zero.

According to an embodiment of the present invention, the first, bounded interval of the color coordinates may be ≤10 SDCM, preferably ≤5 SDCM, and most preferably ≤2 SDCM. Hence, the difference between the highest and the lowest color coordinates of the light emitted by the light sources is equal to or smaller than 10 SDCM. By "SDCM", it is here meant the unit (or steps) of the Standard Deviation of Color Matching, wherein the SDCM is a well-known measurable characteristics which expresses to which extent color coordinates (color points) within a color space are experienced as an equal (or unequal) color by a person subjected to the light. The present embodiment is advantageous in that the human eye of a person may experience two or more colors as (almost) equal colors if the color coordinate difference is ≤10 SDCM, with the consequence that an even more convenient light from the two or more light sources is obtained. Furthermore, if the bounded interval of the color coordinates is ≤5 SDCM, or even ≤2 SDCM, the human eye is even more likely to experience the two or more colors as equal colors.

According to an embodiment of the present invention, the method may further comprise the step of operating the at least two light sources such that the color rendering index of the light emitted from the at least two light sources is maintained over time within in a third, bounded interval. The color rendering index (CRI) is a quantitative measure of the ability of a light source to reproduce the colors of various objects faithfully in comparison with an ideal or natural light source, wherein the concept of color rendering index known to a person skilled in the art. By "bounded interval", it is here meant a (very) narrow, predetermined, bounded interval, such that the color rendering index of the light emitted from the light sources is (almost) equal. The present embodiment is advantageous in that the light from the light sources may render objects in such a way that an observer/viewer experiences the same (or almost the same) color of the objects which are illuminated by the light sources, which even further contributes to the convenience of the light from the two or more light sources. The bounded interval of the color rendering index may be ≤10, preferably ≤5, and most preferably ≤2 (in CRI units/steps).

According to an embodiment of the third aspect of the present invention, the receiving unit may further be configured to detect data embedded in the received light (wherein the light is emitted according to an embodiment of the first or a second aspect of the present invention) and wherein the light emitted from each light source has a spectral distribution which is different from the spectral distribution of light of at least one other light source.

According to an embodiment of receiving unit, the receiving unit may further be configured to detect data embedded in the received light based on spectral filtration of the received light. The present embodiment is advantageous in that the receiving unit may hereby efficiently detect data in light which is characterized by its (unique) spectral properties. The present embodiment is especially advantageous for a detection of data wherein light emitted from each light source has a spectral distribution which is different from the spectral distribution of light of at least one other light source. As the technique(s) of spectral filtration is known to a man skilled in the art, a more detailed description of these techniques is omitted.

According to an embodiment of the third aspect of the present invention, the receiving unit may further be configured to detect a logical one or a logical zero associated with the received light. It will be appreciated that the embodiment hereby encompasses several ways of data detection from the received light. For example, data (e.g. a logical one or a logical zero) may be detected by the characteristics of light from a light source, e.g. by the (unique) spectral distribution of the light. Alternatively, data may be detected by the characteristics of light from a light source, wherein the light may be associated with a specific light source which is arranged to code a logical one or a logical zero.

According to an embodiment of the present invention, there is provided a lighting system comprising at least two light sources, arranged to emit light having color coordinates and luminous intensity. The lighting system further comprises a light module and at least one receiving unit according to any one of the described embodiments. The present embodiment is advantageous in that the lighting system is able to provide an efficient and convenient data transmission by a modulation of the emitted light and a detection of the data embedded in the received light, while maintaining a (almost) constant color and luminous intensity of the light. The lighting system is thereby able to provide a flicker-free data transmission from the light sources to the receiving unit. This feature of the lighting system is highly advantageous, e.g. in that the light emitted from the light sources during operation is perceived by the human eye as pleasant and convenient.

According to an embodiment of the present invention, the color coordinates of the light from each of the light sources of the lighting system may be contained in the first, bounded interval, wherein the first bounded interval is ≤10 SDCM, preferably ≤5 SDCM, and most preferably ≤2 SDCM. The present embodiment is advantageous in that each of the light sources may thereby provide light with color coordinates that the human eye of a person may experience as the same (or almost same) color as the light from another light source. The present embodiment is further advantageous in that the light sources may have the same color coordinate properties, and that the lighting system may thereby be more easily operable.

The lighting system may further comprise at least one sensor arranged for measuring the color coordinates and/or the luminous intensity of the light from the at least two light sources. Hence, the light module of the lighting system may be configured to control the color coordinates and/or the luminous intensity of the light based on the sensor measurement(s). It will be appreciated that the sensor may be connected to (or be arranged/mounted in) the light module, and may communicate with the light module, e.g. by wire or by wire-less communication. The sensor is advantageous in that the light module of the lighting system may even further improve its operation of the light sources such that the color coordinates and the luminous intensity of the light from the light sources indeed remain (almost) constant over time. Based upon a feedback from the sensor, the light module may thereby increase, decrease or maintain one or more operating parameters of the light sources for the purpose of providing a (almost) constant color coordinates and luminous intensity of the light.

According to an embodiment of the present invention, at least one of the at least two light sources may comprise a narrowband element comprising quantum dots. By "narrowband element", it is here meant virtually any element, e.g. a layer, coating, or the like, which is able to emit a light from a light source which is distinguishable from the light of at least one other light source. For example, the narrowband element may be able to emit a light which has a (unique) spectral distribution (spectrum). The present embodiment is advantageous in that the narrowband element may provide an emitted light from the light sources, such that the difference between the unique/individual spectral distributions of the light from the light sources becomes even further enhanced, which even further improves the detection of data embedded in the received light. It will be appreciated that quantum dots are small crystals of semiconducting material, generally having a width or diameter of only a few nanometers. When the quantum dots are excited by incident light, they are able to emit light of a color which is determined by the size and the material of the crystal. Quantum dots provide a very narrow emission band, and consequently provide saturated colors. Furthermore, the emission color can easily be tuned by adapting the size of the quantum dots. Hence, the present embodiment is further advantageous in that light of a particular color may be produced by adapting the size of the quantum dots.

According to an embodiment of the present invention, the quantum dots may comprise a material selected from the group consisting of CdSe, CdS, ZnS, InP, $CuInS_2$, $AgInS_2$, or a combination thereof. The present embodiment is advantageous in that the proposed quantum dot materials are specifically suitable for obtaining a (specific) spectral distribution (spectrum) of the light emitted from the light sources. However, it will be appreciated that virtually any type of quantum dot material known in the art may be used, provided that it has appropriate wavelength conversion characteristics. For environmental reasons, it may be preferred to use cadmium-free quantum dots, or at least quantum dots having a low cadmium content.

It is noted that the invention relates to all possible combinations of features recited in the claims. Further, it will be appreciated that the various embodiments described for the method are all combinable with the light module and/or the receiving unit as defined in accordance with the second and the third aspect of the present invention, respectively. Further objectives of, features of, and advantages with, the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

These and other aspects of the present invention will now be described in more detail, with reference to the appended drawings showing embodiment(s) of the invention.

DETAILED DESCRIPTION OF THE EMBODIMENTS

Figure 1:
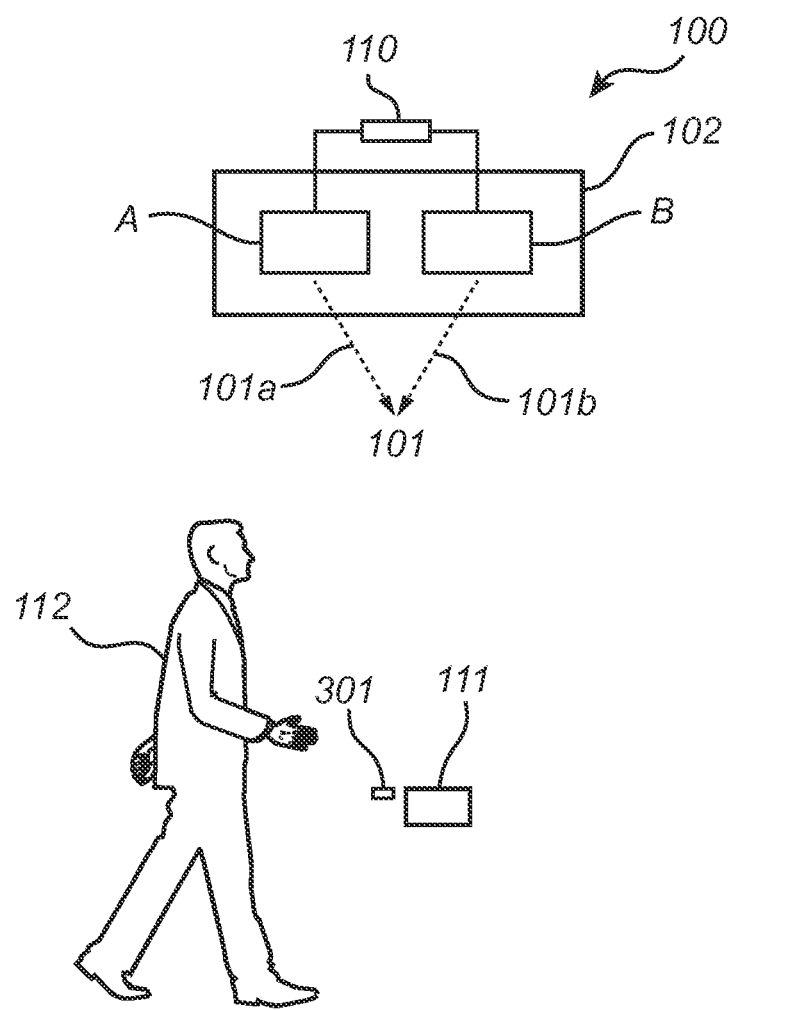
FIG. 1 is a schematic illustration of a lighting system.
Figure 2:
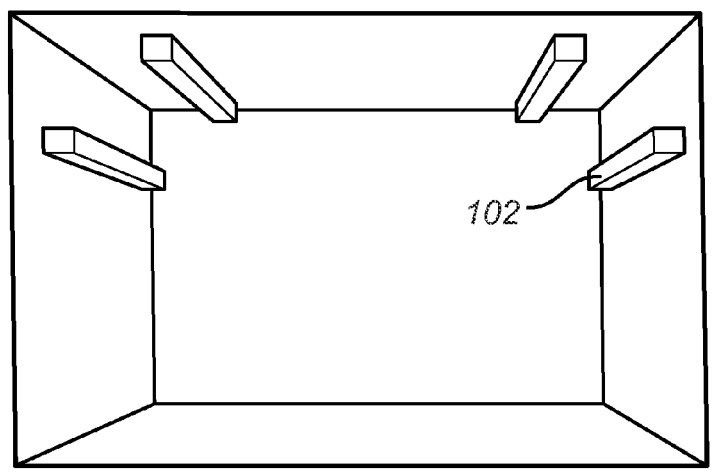
FIG. 2 is a schematic illustration of an arrangement of a lighting system.

FIG. 1 is a schematic illustration of a lighting system 100 for data transmission, wherein the lighting system 100 comprises two light sources A and B. The light sources A and B are arranged to emit light 101a and 101b, respectively, wherein the combined light 101 has color coordinates x, y and luminous intensity Y. The lighting system 100 is specifically arranged for visible light communications (VLC), wherein data is embedded in the emitted, visible light 101 from the light sources A and B. It will be appreciated that the number of light sources may be arbitrary, i.e. there may be more than two light sources A and B. The light sources A and B may be arranged separately, or alternatively, be arranged in a lighting device 102. The light sources A and B (or the lighting device 102) may for example be positioned in the ceiling and/or on the walls of a room, but may alternatively be arranged in substantially any other way. An example of a light source arrangement is shown in FIG. 2, wherein four lighting devices 102 are arranged on the walls of a room.

In FIG. 1, a light module 110 is provided, wherein the light module 110 is configured to operate the light sources A and B. The light module 110 may be connected to the light sources A and B by wire, or alternatively, by a wire-less link. It may be noted that the arrangement of the light module 110 serves merely as an example, and that the light module 110 may alternatively be provided substantially anywhere for operating the light sources A and B. The light module 110 is configured to operate the light sources A and B such that they emit light 101 having color coordinates x, y and luminous intensity Y. The light module 110 is further configured to operate the light sources A and B such that they emit light 101a, 101b, respectively, which is distinguishable from the light of at least one other light source, and to embed data in the combined light 101 emitted from the light sources A and B. Here, it will be appreciated that the light 101a from light source A may be distinguishable from light 101b from light source B by substantially any property (or properties) of the emitted light. Furthermore, it will be appreciated that if the light module 110 is configured to operate more than two light sources, a combination of light from a set of light sources may be distinguishable from a combination of light from another set of light sources. For example, if the light module 110 is configured to operate four light sources A, B, C, D, the light module 110 may be configured to operate the light sources such that the combination of light from A and B is distinguishable from the combination of light from C and D.

Figure 3A:
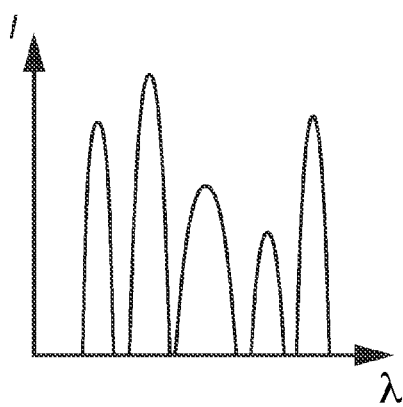
FIGS. 3a-b are schematic diagrams of the respective spectral distribution of the light from the light sources of the lighting system.
Figure 3B:
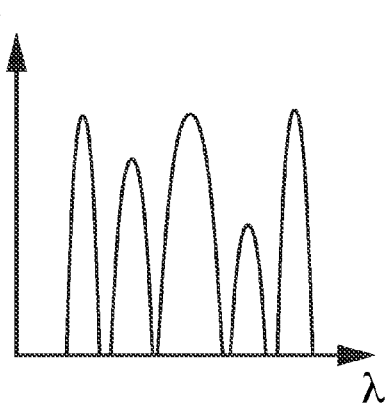

The light module 110 may be configured to operate the light sources A and B such that each light source is arranged to emit light with a spectral distribution which is different from the spectral distribution of light of at least one other light source. Examples of the spectral distributions (spectrums) of the light 101a from light source A and the light 101b from light source B are schematically shown in FIGS. 3a and 3b, respectively, wherein the intensity I is shown as a function of wavelength λ in arbitrary units. Hence, the light module 110 is able to provide light 101a from light source A which has a spectral distribution (spectrum) which is (clearly) distinguishable from the spectrum of the light 101b from light source B, e.g. in the number, amplitude and/or widths of the intensity peaks. Hence, the light module 110 is hereby able to transmit data by the light as provided by the unique/individual spectrums of the light 101a, 101b from the light sources A and B, respectively. The spectral distributions may be associated with data, wherein the data may be a logical one or a logical zero. For example, the light module 110 may switch light source A "on" and switch light source B "off" at a point in time, wherein the spectral distribution of FIG. 3a may e.g. be associated with (designate, indicate) a logical one, and thereafter switch "off" light source A and switch light source B "on" at a later point in time, wherein the spectral distribution of FIG. 3b may e.g. be associated with a logical zero. It will be appreciated that in a case of alternating between the light sources A and B, i.e. operating only one light source at a time for data transmission, the light module 110 provides a robustness in the data transmission.

The lighting control system 100 in FIG. 1 further comprises a receiving unit 111, arranged to receive the light 101 from the at least two light sources A and B and to detect data based embedded in the received light 101. It will be appreciated that the receiving unit 111 may be a detector, a sensor, a camera, or the like (e.g. a CMOS sensor or a CCD sensor array). The receiving unit 111 is able to detect data embedded in the received light 101, as the light 101a, 101b from each light source is distinguishable (separable, different) from the light of at least one other light source with respect to at least one property of the light. In one embodiment, the receiving unit 111 is able to detect data embedded in the received light, as the light 101a, 101b emitted from each light source A and B has a spectral distribution which is different from the spectral distribution of light of at least one other light source. The receiving unit 111 may further be configured to detect data embedded in the received light 101 based on spectral filtration of the received light 101. Furthermore, the receiving unit 111 may be configured to detect a logical one or a logical zero associated with the received light 101.

The light module 110 may further comprise a sensor 301 arranged for measuring the color coordinates x, y and/or the luminous intensity Y of the light 101 from the light sources A and B. The sensor 301 may further be configured to transmit the measured color coordinates x, y and/or the luminous intensity Y to the light module 110 (e.g. by wire or wirelessly) such that the light module 110 may control the color coordinates x, y and/or the luminous intensity Y of the emitted light 101. It will be appreciated that the sensor 301 may be arranged substantially anywhere in a room or a space, e.g. adjacent one or more of the light sources A or B, adjacent the receiving unit 111, etc. Furthermore, there may be more than one sensor 301. The light module 110 may alternatively obtain the color coordinates and/or the luminous intensity of the light 101 from the light sources A and B by estimation, calculation and/or prediction.

Figure 4A:
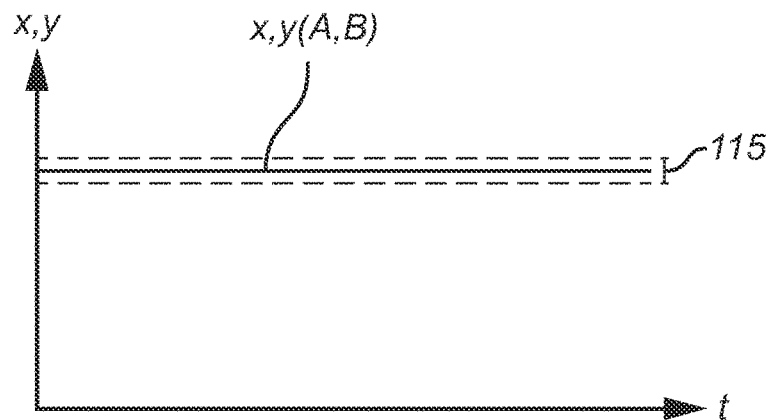
FIGS. 4a-e are schematic diagrams of the color coordinates, the luminous intensity and the color rendering index, respectively, of the light from the light sources of the lighting system.

The light module 110 is further configured to operate the at least two light sources A and B such that the color coordinates x, y (A, B) of the light 101 emitted from the at least two light sources A and B are maintained over time t within a first, bounded interval 115, which is shown in FIG. 4a. The constant (or almost constant) color coordinates x, y (A, B) contribute to light 101 which is perceived by a person 112 subjected to the light 101 as pleasant and convenient during data transmission. The bounded interval 115 of the color coordinates may be ≤10 SDCM, preferably ≤5 SDCM, and most preferably ≤2 SDCM. It will be appreciated that the light module 110 may further be configured to operate the at least two light sources A and B such that the color temperature (CCT) of the light 101 emitted from the at least two light sources A and B is maintained over time within a bounded interval.

Figure 4B:
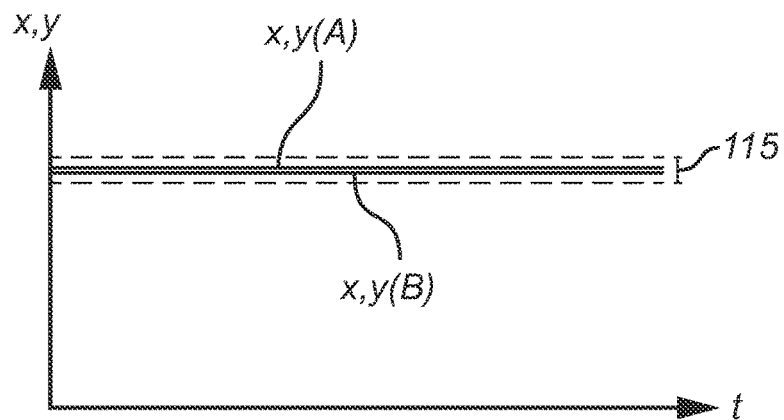

The light module 110 may further be configured to operate the at least two light sources A and B such that the color coordinates x, y of the light 101a, 101b emitted from each of the at least two light sources A and B, i.e. x, y (A) and x, y (B), respectively, are maintained over time t within the first, bounded interval 115, which is shown in FIG. 4b. The light module 110 is hereby configured to maintain the color coordinates x, y (A) and x, y (B) of the light 101a, 101b of each of the light sources A and B, respectively, within the (very) narrow, predetermined, bounded interval 115, i.e. x, y (A)=x, y (B), or at least x, y (A)≈x, y (B). Analogously, it will be appreciated that the light module 110 may further be configured to operate the at least two light sources A and B such that the color temperature CCT of the light 101a, 101b emitted from each of the at least two light sources A and B is maintained over time within a bounded interval. In other words, the light module 110 may be configured to maintain the color coordinates CCT (A) and CCT (B) of the light sources A and B, respectively, within a (very) narrow, predetermined, interval, i.e. CCT (A)=CCT (B), or at least CCT (A)≈CCT (B).

Figure 4C:
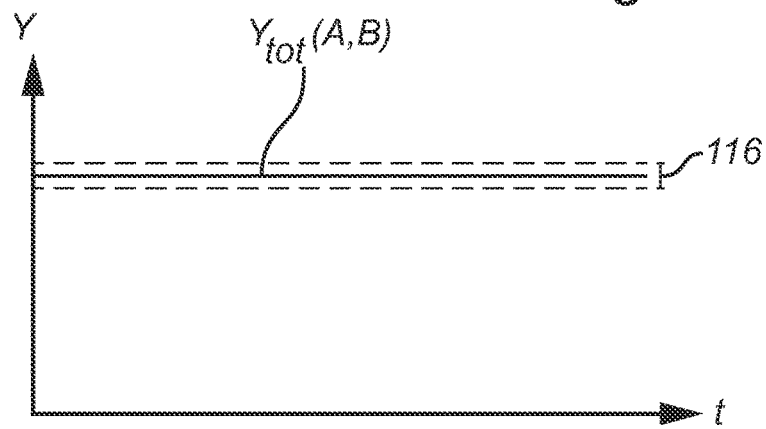

The light module 110 is further configured to operate the (at least two) light sources A and B such that the (total) luminous intensity $Y_{tot}$ of the light 101 from the light sources A and B is maintained over time t within a second, bounded interval 116, as shown in FIG. 4c. Hence, the light module 110 is configured to maintain the (total) luminous intensity $Y_{tot}$ (A, B)=Y(A)+Y(B) within the (very) narrow, predetermined, bounded interval 116. The constant (or almost constant) luminous intensity $Y_{tot}$ (A, B) as provided by the light module 110 of the present invention achieves a pleasant, convenient and flicker-free light 101 from the light sources A and B during data transmission for a person 112 subjected to the light 101. This is highly beneficial as the human eye is sensitive to variations in light intensity.

Figure 4D:
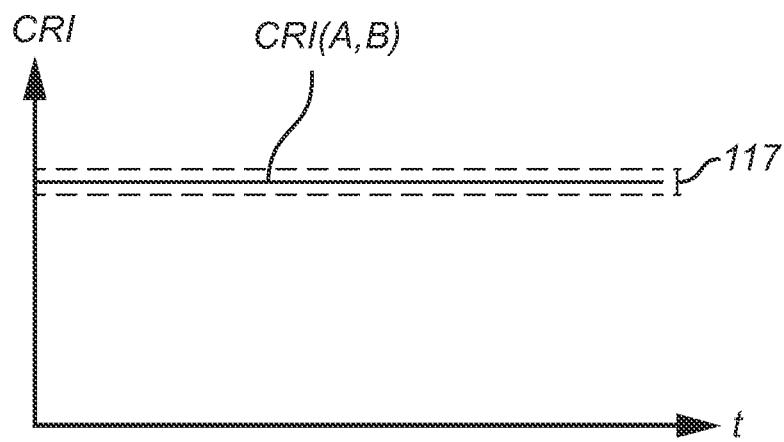
Figure 4E:
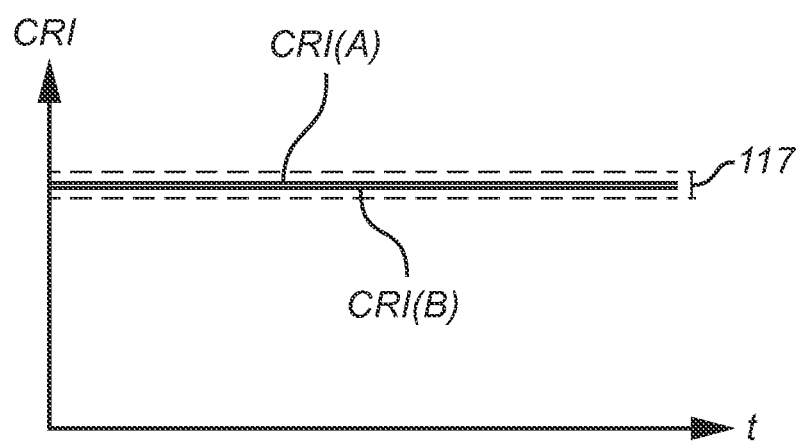

The light module 110 may further be configured to operate the at least two light sources A and B such that the color rendering index CRI (A, B) of the light 101 emitted from the light sources A and B is maintained over time t within a first, bounded interval 117, which is shown in FIG. 4d. The bounded interval 117 of the color rendering index CRI may be ≤10, preferably ≤5, and most preferably ≤2 (in CRI units/steps). Furthermore, the light module 110 may be configured to control the at least two light sources A and B such that the color rendering index CRI of the light 101a, 101b from each of the at least two light sources A and B, denoted as CRI (A) and CRI (B) respectively, is maintained over time t within the third, bounded interval 117, as shown in FIG. 4e. The light module 110 is configured to maintain the color rendering index CRI (A) and CRI (B) within the (very) narrow, predetermined, bounded interval 117, i.e. CRI (A)=CRI (B), or at least CRI (A)≈CRI (B).

Figure 5A:
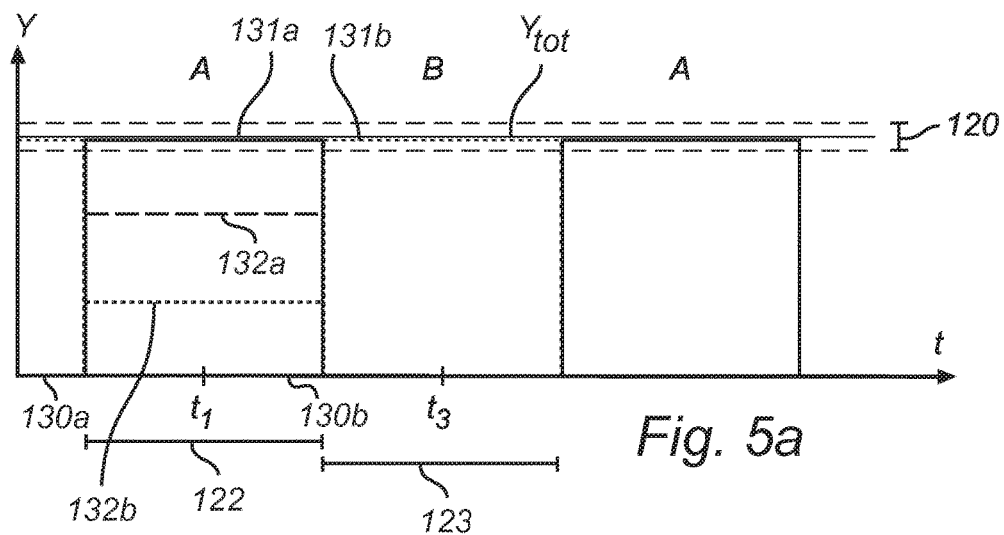
FIGS. 5a-c are schematic diagrams of the luminous intensity of the light from the light sources of the lighting system.
Figure 5B:
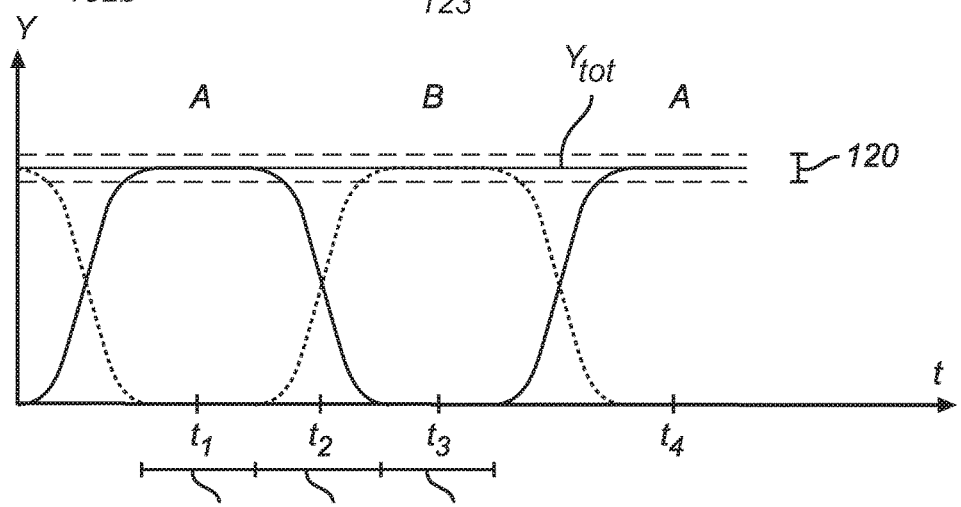
Figure 5C:
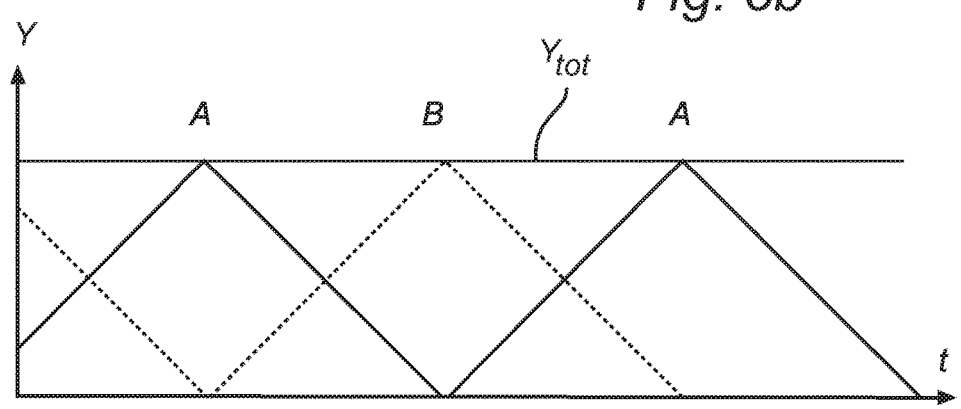

FIGS. 5a-c are diagrams of the luminous intensity Y as a function of time t from the light 101 of the light sources A and B. The light module 110 is configured to operate the light sources A and B such that the luminous intensity Y of the light 101 is maintained over time within a first, bounded interval 120, wherein the total luminous intensity $Y_{tot}$ is indicated by a solid line, and the interval 120 is represented by dashed lines within which $Y_{tot}$ is maintained by the light module 110. In FIG. 5a, the light sources A and B are operated by the light module 110 such that their respectively emitted light 101a, 101b alternates with a step-wise variation. The light module 110 is configured to operate the light sources A and B such that the light immediately switches from a turned-off state 130a, 130b to a fully turned-on state 131a, 131b of the light sources A and B, respectively. In other words, the light module 110 is configured to operate the at least two light sources A and B such that the luminous intensity Y of the light from the at least two light sources A and B varies periodically over time. For example, if there are n light sources, the light 101 from the light sources yields an n-phase illumination, wherein the phase shift between adjacent periods of the light sources is 360°/n and wherein the color coordinates x, y and the luminous intensity Y of the light 101 are maintained over time within predetermined, bounded intervals. In its turned-on state 131a, 131b, each light source A and B is arranged to emit light 101a, 101b which is distinguishable from the light of at least one other light source (e.g. by its spectral distribution) for an embedding of data in the emitted light 101. In this example, light source A retains a maximum light intensity during a time interval 122 (e.g. at time $t_1$), and is then immediately switched from the fully turned-on state 131a to the turned-off state 130a, retaining a minimum light intensity during the time interval 123 (e.g. at time $t_3$), and the profile is thereafter cyclically repeated by the light module 110. Analogously, light source B retains a minimum light intensity during the time interval 122, and is then immediately switched from the fully turned-off state 130b to the turned-on state 131b, retaining a maximum light intensity during the time interval 123. In other words, the light module 110 is hereby configured to provide a phase shift of 180° between the operation (on/off) of the two light sources A and B. Hence, the light module 110 synchronizes the light sources A and B to obtain a total intensity $Y_{tot}$ of the light 101 from the light sources A and B, wherein $Y_{tot}$ remains within the narrow, predetermined, bounded interval 120.

It will be appreciated that instead of an alternating "on/off" operation of the light sources A and B, the light module 110 may alternatively be configured to operate the light sources A and B such that they are arranged to simultaneously emit light at multiple discrete intensity amplitude levels. This is shown in FIG. 5a, wherein light module 110 operates light source A to emit light at intensity level 132a and light source B to emit light at intensity level 132b during time interval 122, wherein $Y_{tot}$ remains within the predetermined, bounded interval 120.

FIG. 5b shows a similar operation of the light sources A and B for data transmission to that shown in FIG. 5a (i.e. a cyclic variation of the light from the light sources A and B), but the light 101a, 101b from the respective light sources A and B is turned on (and turned off) more smoothly. During the time interval 124 (e.g. at time $t_1$), the light module 110 is configured to have light source A turned on and light source B turned off, such that light source A is arranged to transmit data. During the time interval 125 (e.g. at time $t_2$), the light module 110 is configured to decrease the light 101a from light source A and increase the light 101b from light source B. At $t_2$, the light sources A and B contribute equally to $Y_{tot}$. Then, during the time interval 126 (e.g. at time $t_3$), the light module 110 is configured to have light source A turned off and light source B turned on, such that light source B is arranged to transmit data. Then, this operation is cyclically repeated by the light module 110, such that at time $t_4$, only light source A is turned on whereas light source B is turned off. During each time interval 124-126, $Y_{tot}$ is maintained over time within the narrow, predetermined interval 120. It will be appreciated that the receiving unit 111 of the light module 110 may be configured to receive and/or detect data embedded in the light 101 from the light sources A and B, when the intensity Y of the light 101a, 101b from each light source A and B overcomes a specific threshold. It will further be appreciated that the light module 110 may be arranged to operate the light sources A and B simultaneously for a transmission of data embedded in the emitted light 101, wherein the receiving unit 111 is configured to receive and detect data embedded in the light 101 received from the light sources A and B.

FIG. 5c shows an alternative operation of the light sources A and B by the light module 110, wherein the profiles of the light 101a, 101b from the light sources A and B are saw-tooth shaped and phase-shifted by 180°. As previously, $Y_{tot}$ is maintained over time within the narrow, predetermined interval 120.

It will be appreciated that the minimum contribution of intensity Y of the light 101a, 101b from each of the light sources A and B in each of the examples of FIGS. 5a-c may be different from zero. For example, instead of light source A being turned off during time interval 123 in FIG. 5a, it may still be turned on during the time interval 123 and contribute to the intensity. Furthermore, it will be appreciated that the profiles of the light 101a, 101b from the light sources A and B shown in FIGS. 5a-c are provided as examples, and that substantially any other profile of the light 101a, 101b from the light sources A and B (or from more light sources) may be feasible, e.g. a sinusoidal variation.

Furthermore, it will be appreciated that the light sources A and B may be operated such that the luminous intensity $Y_{tot}$ of the light 101 is maintained within a bounded interval, wherein the luminous intensity $Y_{tot}$ decreases or increases on a relatively long time scale. In other words, the two light sources A and B may be operated such that the luminous intensity of the light is (slowly) dimmed or increased, as a luminous intensity decrease or increase on a relatively long time scale still provides a lighting which is perceived by a person as convenient and pleasant.

Figure 6A:
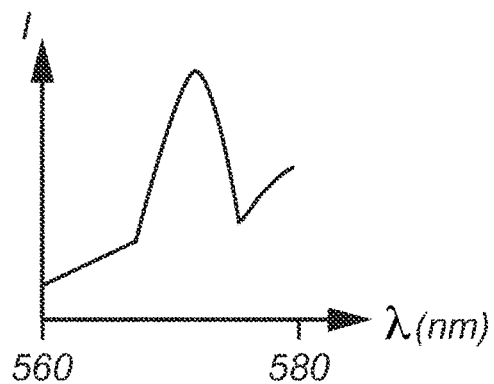
FIGS. 6a-b are schematic diagrams of the respective spectral distribution of the light from the light sources of the lighting system.
Figure 6B:
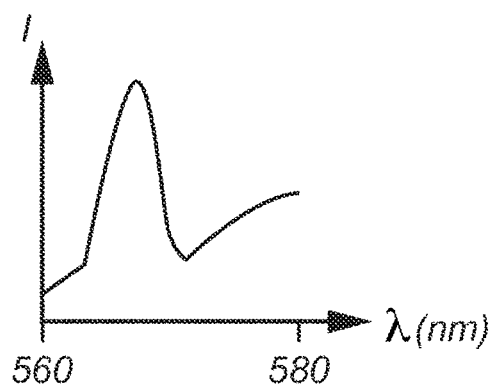

At least one of the at least two light sources (e.g. A and B in FIG. 1) may comprise a narrowband element (not shown), wherein the narrowband element is able to emit light 101 from the light sources A and B having a (specific) spectral distribution (spectrum). The narrowband element may comprise quantum dots (e.g. selected from the group consisting of CdSe, CdS, ZnS, InP, $CuInS_2$, $AgInS_2$, or a combination thereof) wherein the quantum dots are able to provide a very narrow emission band. FIGS. 6a-b show examples of the spectral distributions of the light 101a, 101b from the light sources A and B, respectively, wherein the intensity (I, arb. units) is shown as a function of wavelength ($\lambda$, nm). Here, the quantum dot based light sources A and B respectively emits light which has a color temperature of e.g. 3000 K. However, the relatively narrow peak in the yellow part of the spectrum for light source B in FIG. 6b is shifted for light source A in FIG. 6a by e.g. 20 nm by using quantum dots with a relatively small difference in quantum dot size. It will be appreciated that two or more peaks may be shifted for the spectral distributions of the light 101a, 101b from the light sources A and B in FIGS. 6a-b. Furthermore, the quantum dots may be combined with other phosphors such as inorganic or organic phosphors. It goes without saying that also direct red emitters may be used in combination with broad band emitters.

Even though the invention has been described with reference to specific exemplifying embodiments thereof, many different alterations, modifications and the like will become apparent to those skilled in the art. After studying this description, the described embodiments are therefore not intended to limit the scope of the invention, which is only defined by the appended claims. For example, the number of light sources A and B may be different from that shown in FIG. 1. Furthermore, the distances between the light sources A and B may vary, as well as the distance between the light sources A and B and the receiving unit 111.

The invention claimed is:

1. A method for embedding data in light, comprising the steps of
    operating at least two light sources (A, B) arranged to emit light having color coordinates (x, y) and luminous intensity (Y), wherein each light source is arranged to emit light having color which is distinguishable from the light of at least one other light source, and embedding data in the light emitted from the at least two light sources, wherein the at least two light sources comprise a first subset of light sources that emits light having a first property and a second subset of light sources, different from the first subset, that emits light having a second property distinguished from the first property, wherein the light emitted by the at least two light sources is modulated in accordance with a modulation scheme such that a presence of said first property from said first subset that is greater than any presence of said second property from said second subset defines a logical value in said modulation scheme, and
    operating the at least two light sources such that the color coordinates of the light emitted from the at least two light sources are maintained over time within a first, bounded interval, and the luminous intensity of the light emitted from the at least two light sources is maintained over time within a second, bounded interval.

2. The method as claimed in claim 1, wherein the embedding of data comprises operating the at least two light sources such that each light source is arranged to emit a light with a spectral distribution which is different from the spectral distribution of a light of at least one other light source.

3. The method as claimed in claim 1, wherein the embedding of data in the emitted light comprises associating a logical one or a logical zero with the emitted light.

4. The method as claimed in claim 1, wherein said first, bounded interval is ≤10 SDCM, preferably ≤5 SDCM, and most preferably ≤2 SDCM.

5. The method as claimed in claim 1, further comprising the step of operating the at least two light sources such that the color rendering index of the light emitted from the at least two light sources is maintained over time within a third, bounded interval.

6. The method of claim 1, wherein the logical value is a first logical value and wherein the light emitted by the at least two light sources is modulated in accordance with the modulation scheme such that a presence of said second property from said second subset that is greater than any presence of said first property from said first subset defines a second logical value in said modulation scheme that is different from the first logical value.

7. A light module arranged to embed data in light, said light module being configured to operate at least two light sources (A, B) arranged to emit light having color coordinates (x, y) and luminous intensity (Y), wherein each light source is arranged to emit light which is distinguishable from the light of at least one other light source, to embed data in the light emitted from the at least two light sources, and to operate the at least two light sources such that the color coordinates of the light emitted from the at least two light sources are maintained over time within a first, bounded interval, and the luminous intensity of the light emitted from the at least two light sources is maintained over time within a second, bounded interval, wherein the at least two light sources comprise a first subset of light sources that emits light having a first property and a second subset of light sources, different from the first subset, that emits light having a second property distinguished from the first property, wherein the light emitted by the at least two light sources is modulated in accordance with a modulation scheme such that a presence of said first property from said first subset that is greater than any presence of said second property from said second subset defines a logical value in said modulation scheme.

8. The light module as claimed in claim 7, wherein said light module is further configured to operate the at least two light sources such that each light source is arranged to emit light with a spectral distribution which is different from the spectral distribution of light of at least one other light source.

9. A lighting system, comprising
at least two light sources (A, B), arranged to emit light having color coordinates (x, y) and luminous intensity (Y),
a light module as claimed in claim 7, and
at least one receiving unit.

10. The lighting system as claimed in claim 9, wherein the color coordinates of the light from each of said light sources are contained in said first, bounded interval, wherein said first bounded interval is s ≤10 SDCM, preferably ≤5 SDCM, and most preferably ≤2 SDCM.

11. The lighting system as claimed in claim 9, wherein at least one of said at least two light sources comprises a narrowband element comprising quantum dots.

12. The lighting system as claimed in claim 11, wherein said quantum dots comprise a material selected from the group consisting of $CdSe$, $CdS$, $ZnS$, $InP$, $CuInS_2$, $AgInS_2$, or a combination thereof.

13. The light module according to claim 7, wherein the logical value is a first logical value and wherein the light emitted by the at least two light sources is modulated in accordance with the modulation scheme such that a presence of said second property from said second subset that is greater than any presence of said first property from said first subset defines a second logical value in said modulation scheme that is different from the first logical value.

14. A receiving unit for receiving light, said receiving unit being configured to
receive light emitted from at least two light sources (A, B) arranged to emit light having color coordinates (x, y) and luminous intensity (Y), wherein each light source is arranged to emit light which is distinguishable from the light of at least one other light source, wherein data is embedded in the emitted light, wherein the at least two light sources comprise a first subset of light sources that emits light having a first property and a second subset of light sources, different from the first subset, that emits light having a second property distinguished from the first property, wherein the light emitted by the at least two light sources is modulated in accordance with a modulation scheme such that a presence of said first property from said first subset that is greater than any presence of said second property from said second subset defines a logical value in said modulation scheme, and
detect data embedded in the received light, wherein the color coordinates of the light emitted from the at least two light sources are maintained over time within a first, bounded interval, and the luminous intensity of the light emitted from the at least two light sources is maintained over time within a second, bounded interval.

15. The receiving unit as claimed in claim 14, wherein the light emitted from each light source has a spectral distribution which is different from the spectral distribution of light of at least one other light source.

16. The receiving unit as claimed in claim 14, wherein said receiving unit is further configured to detect data embedded in the received light based on spectral filtration of the received light.

17. The receiving unit as claimed in claim 14, wherein said receiving unit is further configured to detect a logical one or a logical zero associated with the received light.

18. The receiving unit of claim 14, wherein the logical value is a first logical value and wherein the light emitted by the at least two light sources is modulated in accordance with the modulation scheme such that a presence of said second property from said second subset that is greater than any presence of said first property from said first subset defines a second logical value in said modulation scheme that is different from the first logical value.

\* \* \* \* \*